(12) United States Patent
Biro (10) Patent No.: US 8,762,635 B1
(45) Date of Patent: Jun. 24, 2014

(54) METHOD AND APPARATUS FOR SELECTING AND STORING DATA ON A HARD DISK DRIVE

(75) Inventor: Ross A. Biro, Ashburn, VA (US)

(73) Assignee: Google Inc., Mountain View, CA (US)

( * ) Notice: Subject to any disclaimer, the term of this patent is extended or adjusted under 35 U.S.C. 154(b) by 1531 days.

(21) Appl. No.: 11/095,196

(22) Filed: Mar. 31, 2005

(51) Int. Cl.
*G06F 12/00* (2006.01)

(52) U.S. Cl.
USPC .......................................... 711/112; 711/154

(58) Field of Classification Search
USPC .................................................. 711/112, 154
See application file for complete search history.

(56) References Cited

U.S. PATENT DOCUMENTS

| | | | |
|---|---|---|---|
| 4,636,946 A * | 1/1987 | Hartung et al. | 711/136 |
| 5,140,683 A * | 8/1992 | Gallo et al. | 711/117 |
| 5,394,537 A * | 2/1995 | Courts et al. | 711/202 |
| 5,774,682 A * | 6/1998 | Benhase et al. | 711/118 |
| 5,845,104 A * | 12/1998 | Rao | 711/113 |
| 6,078,452 A | 6/2000 | Kittilson et al. | |
| 6,606,714 B1 * | 8/2003 | Thelin | 714/8 |
| 6,629,198 B2 | 9/2003 | Howard et al. | |
| 6,745,305 B2 | 6/2004 | McDowell | |
| 6,760,756 B1 * | 7/2004 | Davis et al. | 709/215 |
| 6,990,563 B2 | 1/2006 | Biessener et al. | |

\* cited by examiner

*Primary Examiner* — Matthew Bradley
(74) *Attorney, Agent, or Firm* — Fish & Richardson P.C.

(57) ABSTRACT

Methods and apparatus for selecting and storing data on a hard disk drive are described herein. In one embodiment, the method includes selecting a first data set for writing to a hard disk drive (HDD). The first data set can reside in a main memory of a computer and the first data set can be associated with a first disk address on the HDD. The method can also include determining that a second data set residing in the main memory is likely to be associated with a second disk address located within a selected proximity of the first disk address. The method can also include creating a third data set that includes the first data set and the second data set and writing the third data set to the HDD.

17 Claims, 8 Drawing Sheets

METHOD AND APPARATUS FOR SELECTING AND STORING DATA ON A HARD DISK DRIVE

FIELD

This invention relates generally to the field of data processing and storage and more particularly to the field of selecting and storing data on persistent storage devices.

BACKGROUND

Computer designers are constantly searching for faster and more reliable techniques for storing and retrieving data from hard disk drives ("HDDs"). Designers are particularly concerned with reducing HDD latencies and reducing data loss resulting from HDD faults.

In attempting to reduce latencies associated with reading and writing data to HDDs, designers often focus on improving operating system ("OS") disk schedulers. Disk scheduling algorithms often increase HDD performance by minimizing mechanical movements of the HDD. For example, for each HDD write request in a disk scheduling queue, a disk scheduler may determine how far a HDD's read/write head will move to service the request. The disk scheduler may then service the requests in order of those requiring the least read/write head movement. Although this and other disk schedulers may improve certain aspects of HDD performance, designers often overlook improving HDD performance by modifying other OS components.

In attempting to reduce data loss resulting from HHD faults, designers have developed systems for detecting defects in HDD media. Many of these systems are contained within logic that makes-up a HDD. Typically, HDD defect management systems prevent data loss by searching disk for defects. After finding defects, these systems typically move data from defective areas to "healthy" areas. Sometimes, despite efforts by the defect management systems, HDDs lose data.

Therefore, there is a need for a system that reduces both HDD latencies and HDD data loss.

SUMMARY

Methods and apparatus for selecting and storing data on a hard disk drive are described herein. In one embodiment, the method includes selecting a first data set for writing to a hard disk drive (HDD). The first data set can reside in a main memory of a computer and the first data set can be associated with a first disk address on the HDD. The method can also include determining that a second data set residing in the main memory is likely to be associated with a second disk address located within a selected proximity of the first disk address. The method can also include creating a third data set that includes the first data set and the second data set and writing the third data set to the HDD.

In one embodiment, the apparatus includes a memory manager to select a first data set for writing to a first sector on a hard disk drive. The memory manager can select a second data set associated with a second sector, where the second sector is within a predetermined proximity of the first sector. The apparatus can also include a disk queue to store the first and second data sets as a single disk queue entry. The apparatus can also include a disk scheduler to transmit the single disk queue entry to the hard disk drive.

BRIEF DESCRIPTION OF THE FIGURES

The present invention is illustrated by way of example and not limitation in the Figures of the accompanying drawings in which.

DESCRIPTION OF THE EMBODIMENTS

This description of the embodiments describes methods and apparatus for selecting and storing data on a hard disk drive.

This description of the embodiments is divided into four sections. The first section provides an introduction to embodiments of the invention. The second section describes an exemplary operating environment and system architecture. The third section describes system operations and the fourth section provides some general comments.

Introduction

This section introduces a system for reducing data loss resulting from hard disk drive ("HDD") errors and for improving disk write performance. The discussion below will describe data transmissions and operations performed by embodiments of the system.

Figure 1:
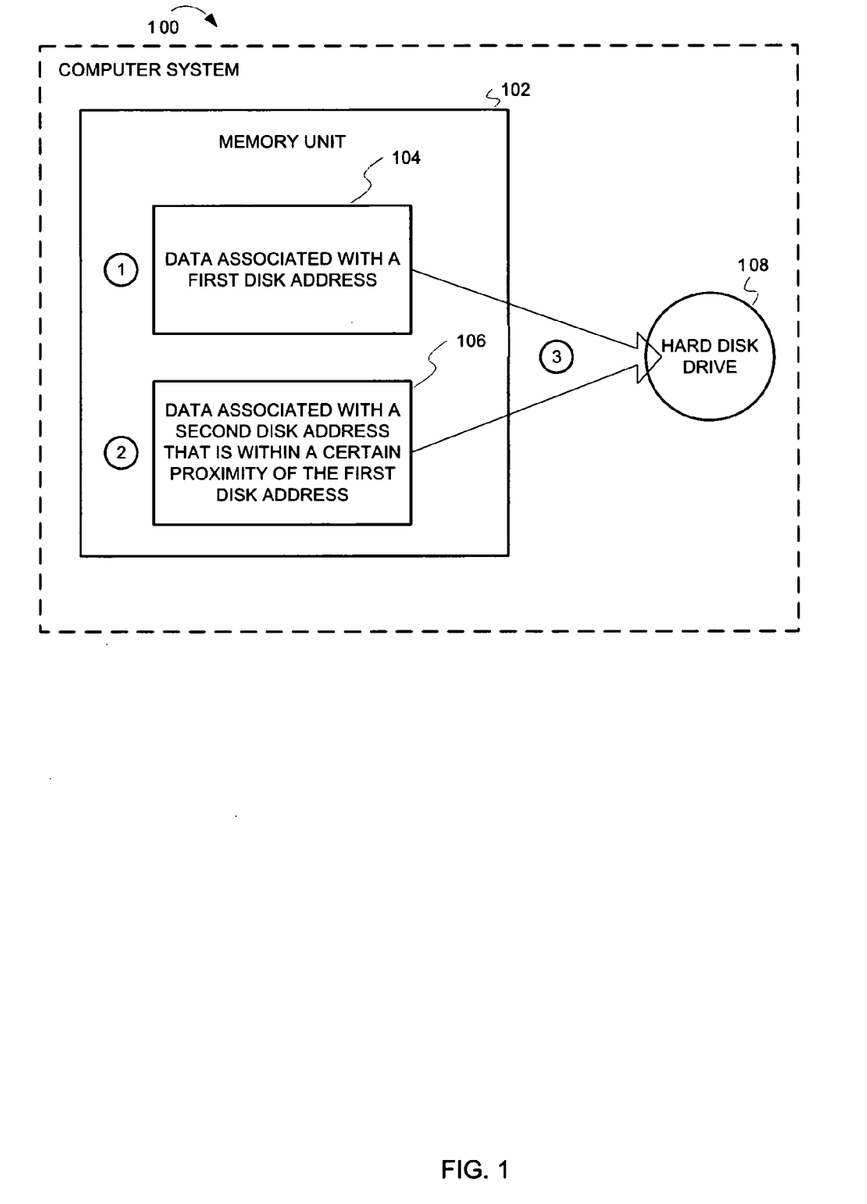
FIG. 1 is a dataflow diagram illustrating operations associated with writing data from memory to disk, according to exemplary embodiments of the invention.

FIG. 1 is a dataflow diagram illustrating operations associated with writing data from memory to disk, according to exemplary embodiments of the invention. FIG. 1 shows a computer system 100 including a memory unit 102 and a hard disk drive (HDD) 108.

The operations of FIG. 1 are divided into three stages. At stage 1, the computer system 100 determines that a data set stored in the memory unit 104 should be written to the HDD 108. The computer system 100 may write data to the HDD 108 after the data has been modified in the memory unit 112. The data set (see block 104) is associated with a first disk address.

At stage 2, the computer system 100 selects from the memory unit 104 another data set (see block 106) associated with a second disk address, where the second disk address is within a certain proximity of the first disk address. In one embodiment, the data associated with the second disk address includes only data that has been modified. In another embodiment, the data associated with the second disk address includes data that has not been modified while in the memory unit 104.

At stage 3, the data set associated with the first disk address and the data set associated with the second disk address are written to the HDD 108. In one embodiment, the computer system 100 inserts both data sets 104 and 106 (or some reference to both data sets) into a disk scheduling queue and then writes the data sets to the HDD 108.

The operations discussed above can provide certain benefits, which may become apparent upon discovering defective disk segments (e.g., unreadable sectors). Computer systems typically write only modified data back to disk. However, in one embodiment, the computer system 100 writes unmodified data to the HDD 108. If a disk segment becomes unreadable while the segment's unmodified data resides in memory, the computer system can avoid losing the segment's unmodified data by writing the unmodified data to a "healthy" segment before flushing the unmodified data from memory. For computer systems that do not write-back unmodified data to the HDD, the data can be lost. Furthermore, there is no significant reduction in performance because the computer system 100 writes both data sets (e.g., blocks 104 and 106) during the same sequence of operations, thus avoiding many latencies associated writing data to a HDD. Thus, the operations discussed above enable the computer system 100 to reduce data loss and increase performance of HDD write operations.

Hardware, Operating Environment, and System Architecture

This section provides an overview of the exemplary hardware and operating environment in which embodiments of the invention can be practiced. This section also describes one or more operating system components that can perform operations according to embodiments of the invention.

Exemplary Hardware and Operating Environment

Figure 2:
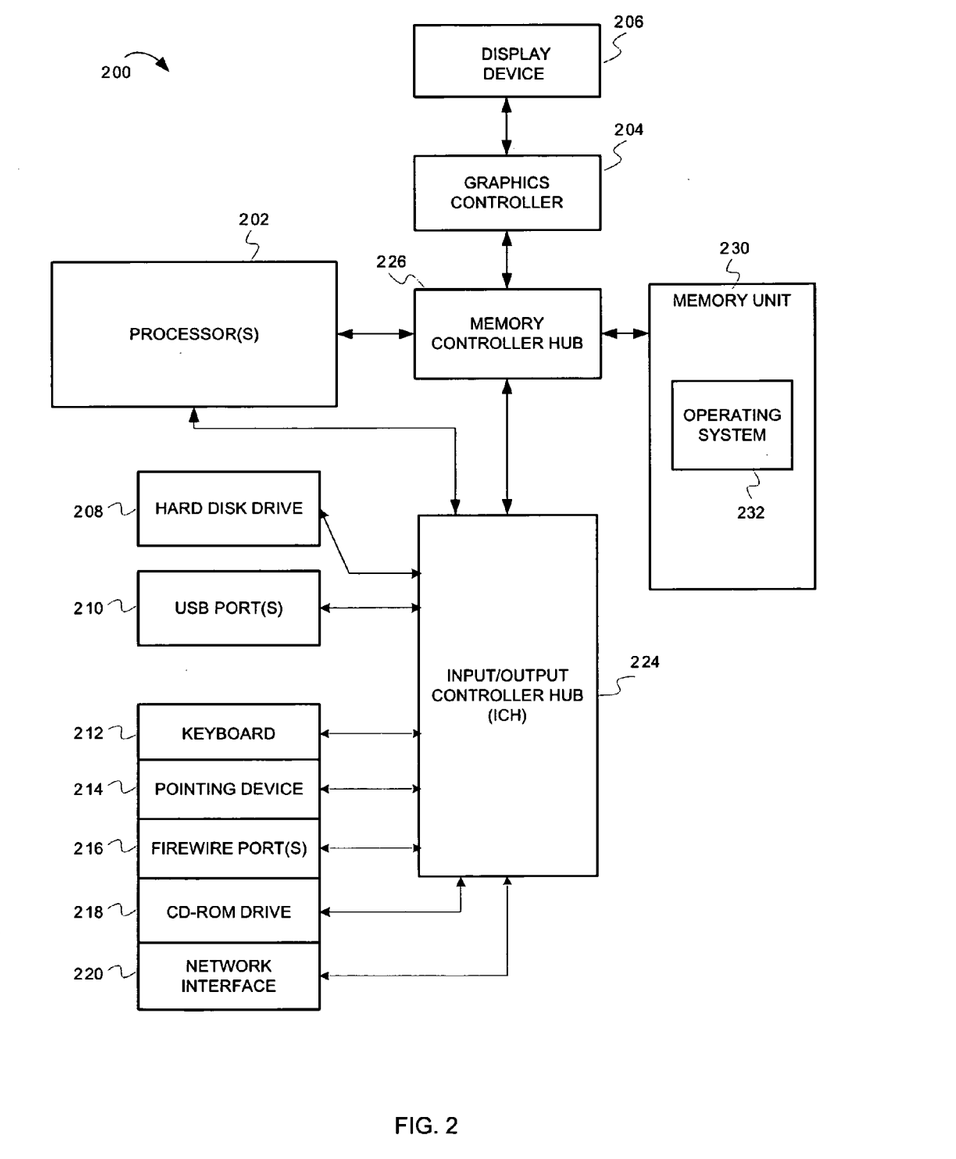
FIG. 2 illustrates a computer system, according to exemplary embodiments of the invention.

FIG. 2 illustrates a computer system, according to exemplary embodiments of the invention. As illustrated in FIG. 2, the computer system 200 includes processor(s) 202 connected to an Input/Output controller hub (ICH) 224 and a memory controller hub 226. The processor(s) 202 may comprise any suitable processor architecture. The computer system 200 may comprise one, two, three, or more processors, any of which may execute a set of instructions in accordance with embodiments of the invention.

The memory controller hub 226 is connected to the ICH 224, a memory unit 230, and a graphics controller 204. The graphics controller 204 controls the display of information on a display device 206, according to embodiments of the invention.

The memory unit 230 includes all or part of an operating system 232. The memory unit 230 can store data and/or instructions, and may comprise any suitable memory type, such as a dynamic random access memory (DRAM).

The input/output controller hub (ICH) 224 provides an interface to I/O devices or peripheral components for the computer system 200. The ICH 224 may comprise any suitable interface controller to provide for any suitable communication link to the processor(s) 202 and/or to any suitable device or component that communicates with the ICH 224. In one embodiment, the ICH 224 provides suitable arbitration and buffering for each interface.

The ICH 224 provides an interface to a hard disk drive (HDD) 208. Embodiments of the HDD 208 will be described below. The ICH 224 also provides an interface to any suitable universal serial bus (USB) devices through one or more USB ports 210. For one embodiment, the ICH 224 also provides an interface to a keyboard 212, pointing device 214, a CD-ROM drive 218, one or more suitable devices through one or more firewire ports 216. The ICH 224 also provides a network interface 220 though which the computer system 200 can communicate with other computers and/or devices.

In one embodiment, ant the components of the system 200 can be further integrated or divided. For example, the memory controller hub 226, graphics controller 204, and/or processor(s) 202 can be incorporated into a single chip.

In one embodiment, the computer system 200 includes a machine-readable medium that stores a set of instructions (e.g., software) embodying any one, or all, of the methodologies for decreasing write times and reducing data loss associated with HDDs described herein. Furthermore, software can reside, completely or at least partially, within memory unit 230 and/or within the processor(s) 202.

Figure 3:
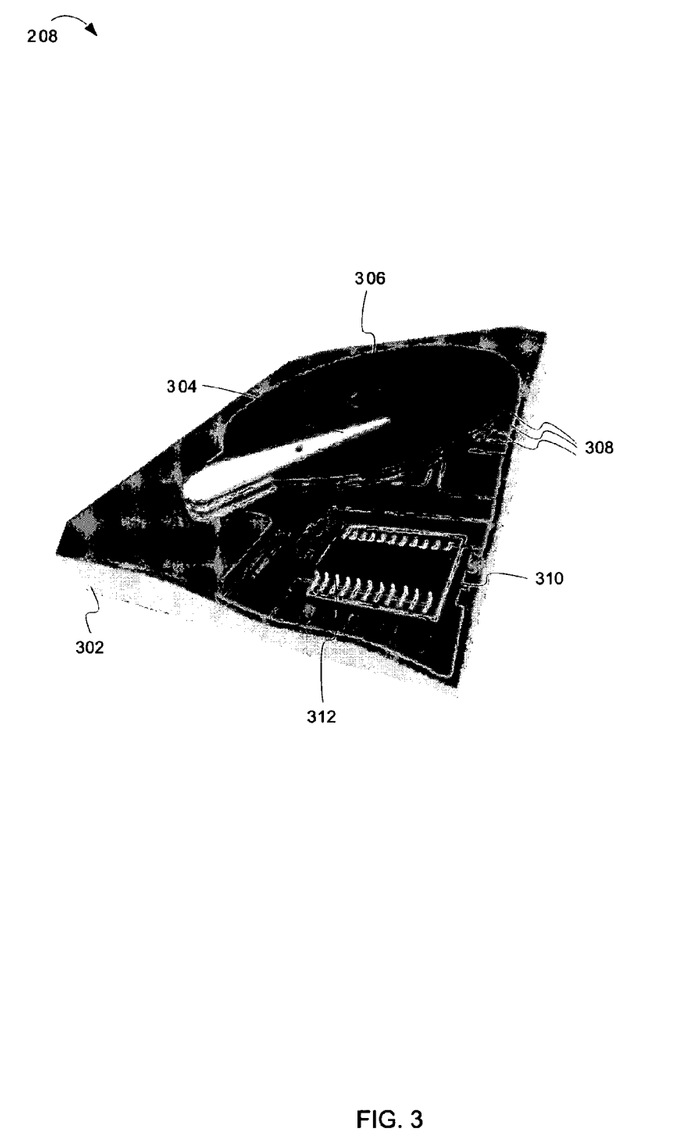
FIG. 3 is a perspective view of a hard disk drive, according to embodiments of the invention.
Figure 4:
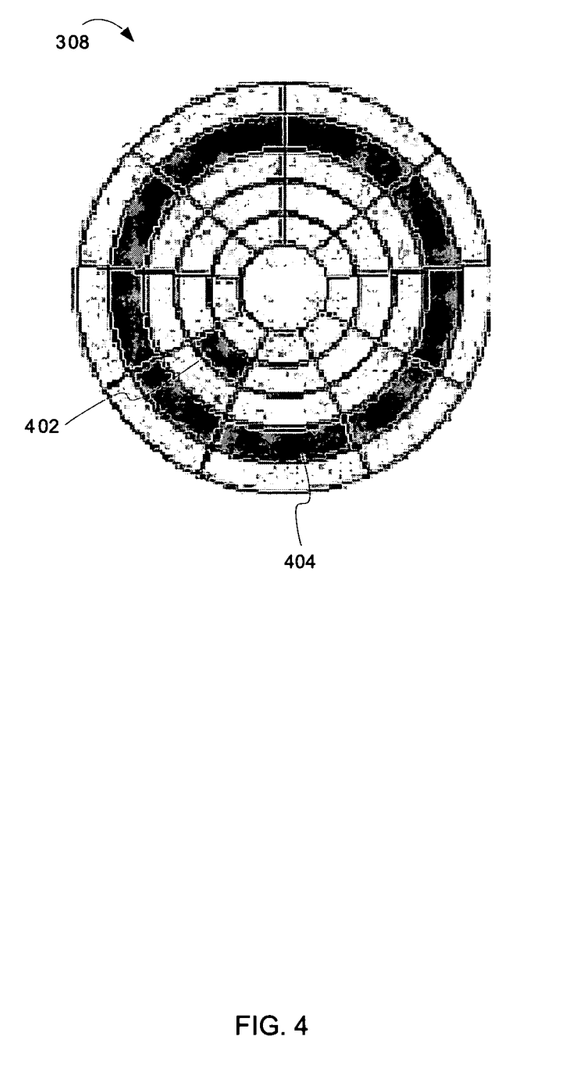
FIG. 4 is a diagram illustrating an addressing format for a hard disk drive platter, according to embodiments of the invention.
Figure 5:
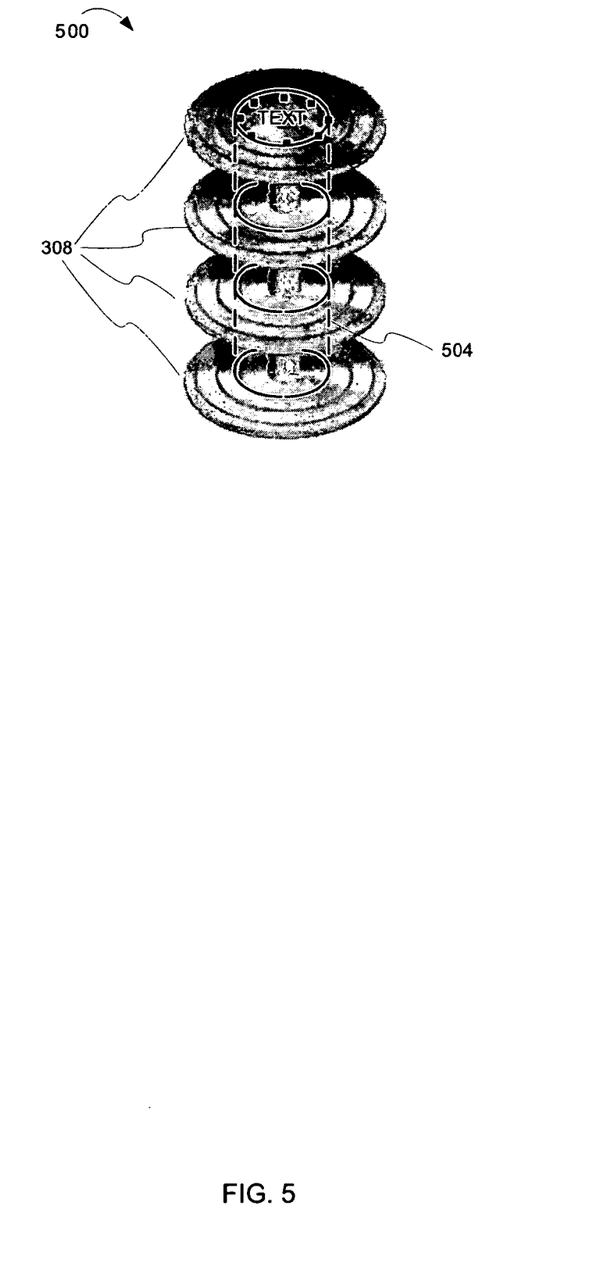
FIG. 5 is a diagram illustrating a method for organizing and addressing a stack of platters, according to embodiments of the invention.

While the discussion of FIG. 2 describes a computer system, FIGS. 3-5 describe embodiments of a hard disk drive.

FIG. 3 is a perspective view of a hard disk drive, according to embodiments of the invention. In FIG. 3, the HDD 208 includes a controller 312 and data cache 310. The HDD 300 also includes read/write heads 304 and a spindle 306 upon which platters 308 are mounted. Additionally, the HDD 208 includes a servo motor (not shown) that spins the spindle 306 and platters 308.

The controller 312 can control operations for writing data to the platters 308. For example, the controller 312 can fetch data stored in the data cache 310 and move the read/write head 304 to disk addresses where data can be written to the platters 308. The controller 312 finds given disk addresses based on the platters' format and organization. FIGS. 4 and 5 describe methods for organizing and addressing the platters 308.

FIG. 4 is a diagram illustrating an addressing format for a hard disk drive platter, according to embodiments of the invention. FIG. 4 shows a platter 308 divided into sectors and tracks. The platter 308 is divided along a set of concentric rings, where each ring has an incrementally larger radius. In addition to dividing the platter 308 with rings, the platter 308 is also divided like a pie (i.e., divided by boundaries starting at the platter's center and emanating radially to the platter's outer edge). Each piece of the divided platter forms a sector 402. All sectors of a same radius make-up a track (e.g., see track 504).

The tracks and sectors can be addressed by assigning a number to each track and by assigning a number to each sector of the track. For example, the platter 308 includes five tracks numbered one through five, where the innermost track can be track 1 and the outermost track can be track 5. The track 404 can be identified as track 4. The sectors of each track can be numbered one through nine. As such, the sector 402 can be identified as sector 1 of track 2. While FIG. 4 describes mapping data on a single platter, FIG. 5 describes addressing data on a stack of platters.

FIG. 5 is a diagram illustrating a method for organizing and addressing a stack of platters, according to embodiments of the invention. The platter stack 500 includes platters 308. As described above, each platter 308 can be divided into sectors and tracks. The platter stack 500 can also include cylinders, where each cylinder includes a track from each platter. For example, cylinder 1 (see block 504) includes track 1 from each of the four platters, cylinder 2 includes track 2 from each of the platters, and so on. Because HDDs typically have at least one read/write head for each platter, the HDD can simultaneously write data to addresses on every track in a cylinder.

Exemplary System Architecture

This section describes a system architecture for reducing data loss and optimizing disk write operations, according to embodiments of the invention.

Figure 6:
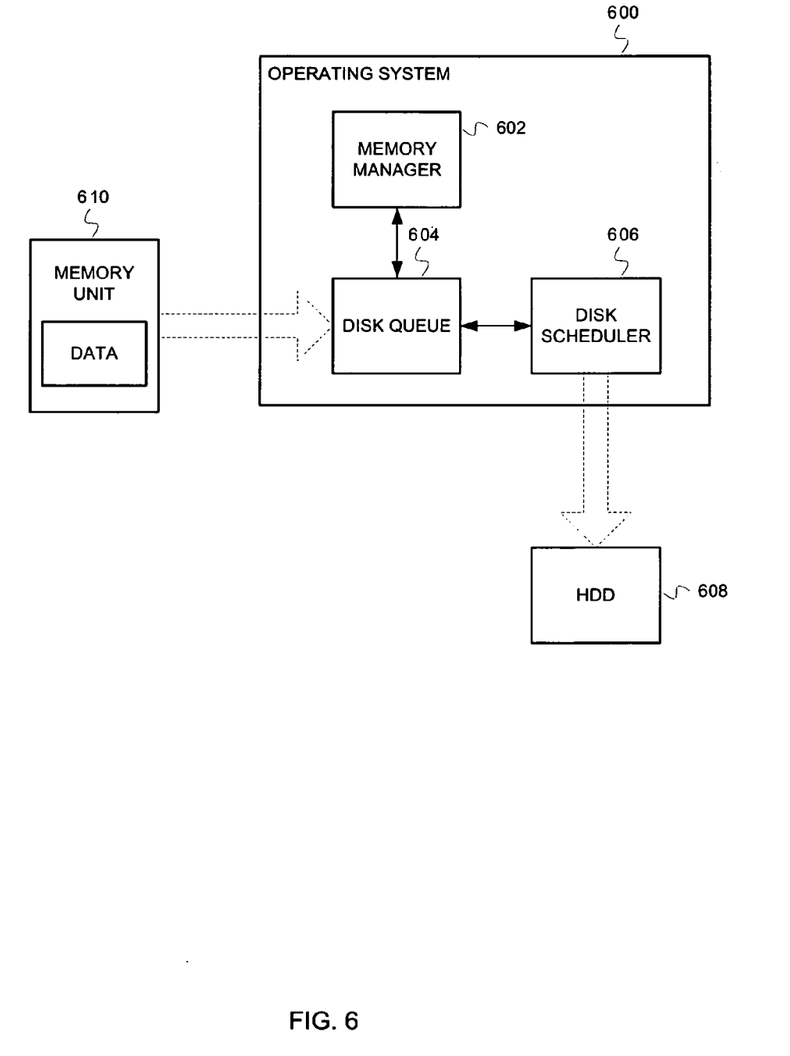
FIG. 6 is a block diagram illustrating operating system components that can perform operations for reducing data loss and increasing disk writing performance, according to exemplary embodiments of the invention.

FIG. 6 is a block diagram illustrating operating system components that can perform operations for reducing data loss and increasing disk writing performance, according to exemplary embodiments of the invention. In FIG. 6, the operating system 232 includes a memory manager 602 that communicates with a disk queue 604, which is communicates with a disk scheduler 606. In one embodiment, the operating system also includes other components, such as process schedulers, device drivers, interrupt handlers, etc.

In one embodiment, the memory manager 602 can select data in the memory unit 610 for writing to a HDD 608. The memory manager 602 can select data from memory unit 610 based on where the data is stored on the HDD 608. For example, the memory manager 602 can select from memory data that is stored on disk at a particular cylinder, track, and sector address. Operations for selecting data from memory are described in greater detail below, and the next section.

The disk queue 604 can store the selected data during the process of writing the selected data to the HDD 608. The disk scheduler 606 can determine an order in which the entries in the disk queue 604 are written to the HDD 608. In one embodiment, the HDD 608 includes the components described above with reference to FIGS. 3, 4, and 5.

The next section describes operations which can be performed by the components described above.

System Operations

This section describes operations performed by embodiments of the invention. In certain embodiments, the operations are performed by instructions residing on machine-readable media (e.g., software), while in other embodiments, the methods are performed by hardware, firmware, or other logic (e.g., digital logic).

In this section, FIGS. 7 and 8 will be discussed. In particular, FIG. 7 describes operations for selecting data in memory for writing to a HDD, while FIG. 8 describes operations for writing the selected data to the HDD.

Figure 7:
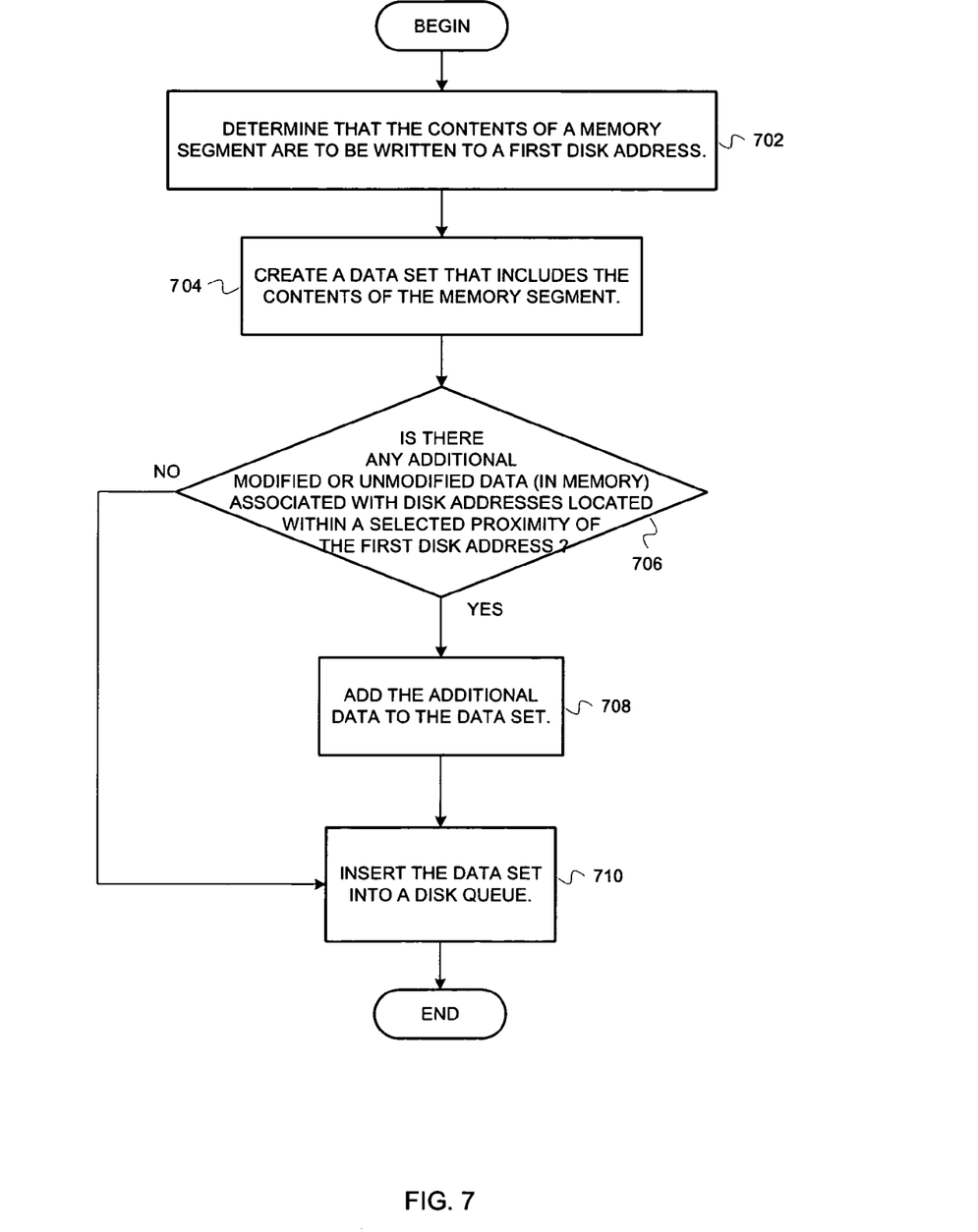
FIG. 7 is a flow diagram illustrating operations for selecting data from memory for writing to a hard disk drive, according to exemplary embodiments of the invention.

FIG. 7 is a flow diagram illustrating operations for selecting data from memory for writing to a hard disk drive, according to exemplary embodiments of the invention. The flow diagram 700 will be described with reference to FIGS. 3 and 6. The flow diagram 700 commences at block 702.

At block 702, the memory manager 602 determines that data occupying a segment of the memory unit 610 should be written to an address on the HDD 608. The flow continues at block 706.

At block 706, the memory manager 602 determines whether there is any additional data in the memory unit 610 associated with HDD addresses within a selected proximity of the first HDD address. In one embodiment, the HDD's geometry is hidden from the memory manager 602, so the memory manager 602 cannot be absolutely certain where data in memory will be stored on disk. In such an embodiment, the memory manager 602 determines whether there is additional data in the memory unit 610 likely to be associated with HDD addresses located within a selected proximity of the first HDD address.

In one embodiment, the HDD addresses can be within the same cylinder as the first disk address. In one embodiment, the HDD disk addresses must be within the same track, but can be up to three sectors away from the first disk address. Other embodiments call for other suitable proximities. In one embodiment, the additional data includes data that has not been modified while stored in the memory unit 610. In one embodiment, the additional data includes data that has been modified while stored in the memory unit 610. The flow continues at block 708.

At block 708, the memory manager 602 creates a data set that includes the contents of the memory segment (determined at block 702) and the additional data (selected at block 706). The flow continues at block 710.

At block 710, the memory manager 602 inserts the data set into the disk queue 604. From block 710, the flow ends.

Figure 8:
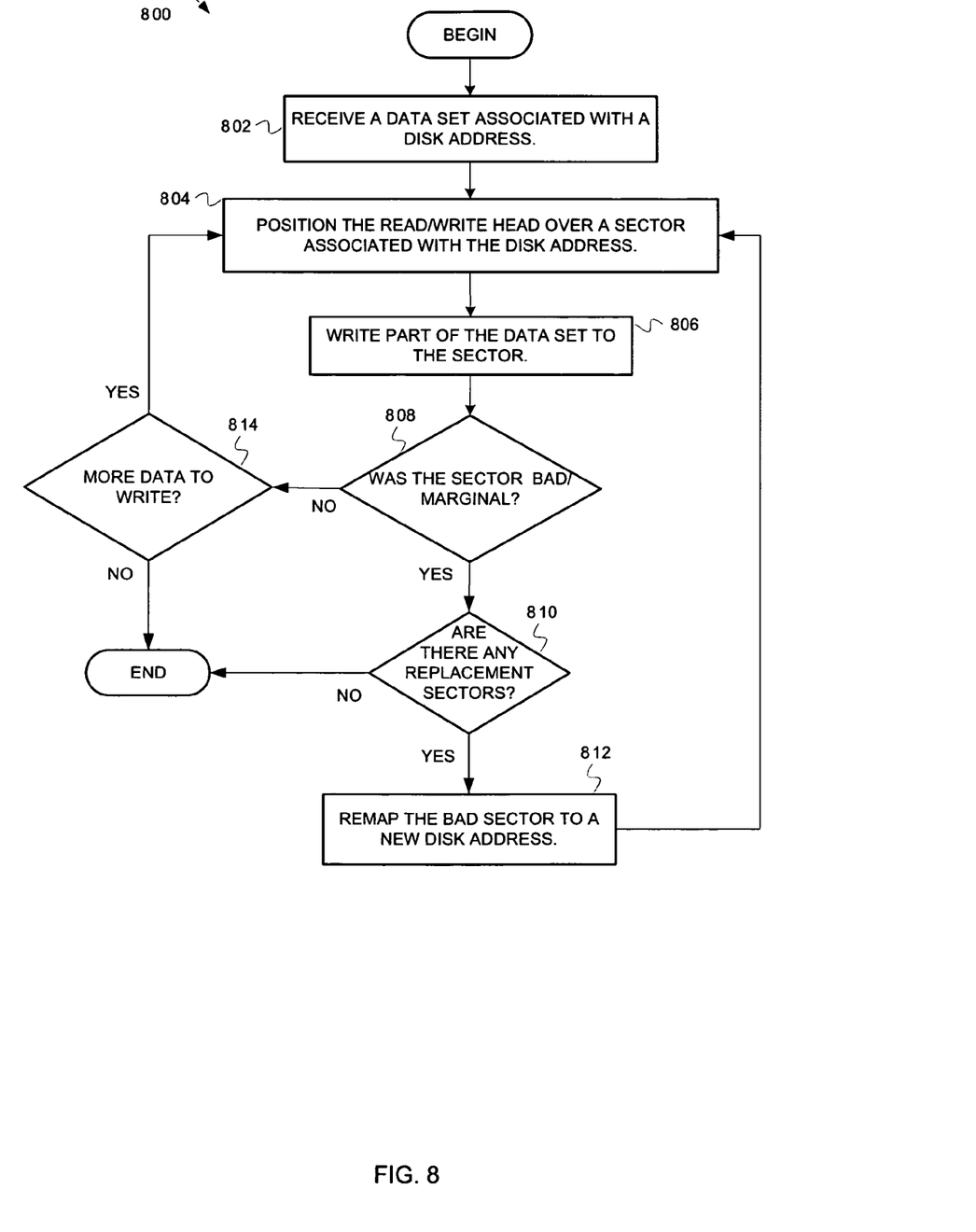
FIG. 8 is a flow diagram illustrating operations for writing data selected from memory to a hard disk drive, according to exemplary embodiments of the invention.

While FIG. 7 describes operations for selecting data from memory for writing to a HDD, FIG. 8 describes operations for writing the selected data to the HDD. Typically, operating systems do not write data to disk unless the data has been modified in memory. As a result, if a disk sector becomes unreadable while the sector's data resides in memory, an operating system may miss an opportunity to preserve the sector's data by neglecting to write-back unmodified data to disk. However, in one embodiment, if a sector becomes unreadable while its data resides in memory, the sector's data is preserved because the operating system 600 writes-back unmodified data to replacement sectors (see discussion block 706 and see FIG. 8).

FIG. 8 is a flow diagram illustrating operations for writing data selected from memory to a hard disk drive, according to exemplary embodiments of the invention. The flow diagram 800 will be described with reference to FIGS. 3, 4, and 6. The flow diagram 800 commences at block 802.

At block 802, the operating system's disk scheduler 606 selects a data set from the disk queue 604 and transmits the data set to the HDD 608. In one embodiment, the data set was selected by performing the operations shown in FIG. 7. As such, the data set can include data to be written to a first disk address and additional data to be written to disk addresses located within a selected proximity of the first disk address. In one embodiment, the disk scheduler 606 transmits the data set to the HDD's data cache 310. The HDD 608 can include an additional disk scheduler (not show) to schedule read/write operations after the HDD 608 has received the data set from the operating system 600. For example, after the HDD 608 has received data from the operating system 600, the additional disk scheduler can modify the order in which data sets are written to disk. The flow continues at block 804.

At block 804, the HDD's controller 312 moves a read/write head 304 to a cylinder, track, and sector associated with the disk address. The flow continues at block 806.

At block 806, the read/write head 304 writes part of the data set to the sector. Writing data that has not been modified in the memory can prevent data loss when the data is associated with a sector that becomes unreadable (see discussion of 808, 810, and 812 below). Moreover, writing additional data (modified or unmodified) contemporaneously with data requiring disk write-back can reduce latencies associated with disk write operations. The flow continues at block 808.

At block 808, the HDD's controller 312 determines whether the sector is bad or marginal. In one embodiment, a sector is marginal if it may soon become unreadable, while a sector is bad if it is presently unreadable. If the sector was bad/marginal, the flow continues at block 810. Otherwise, the flow continues at block 814.

At block 810, the HDD's controller 312 determines whether there are any replacement sectors available on the platters 308. If there are no replacement sectors, the flow ends. Otherwise, the flow continues at block 812.

At block 812, the controller 312 modifies a disk address map to indicate that data destined for the bad sector should instead be written to a replacement sector. The flow continues at block 804.

At block 814, a determination is made about whether there is more data for writing to the HDD. If there is no more data for writing, the flow ends. Otherwise, the flow continues at block 804.

General Comments

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Moreover, it should be understood that although the flow diagrams depict serial operations, certain embodiments could perform certain of those operations in parallel.

The invention claimed is:

1. A machine-readable storage device comprising instructions, which when executed by a machine cause the machine to perform operations comprising:
    selecting a first data set that is stored in a main memory of a computer, and that is associated with a first address on a persistent storage device;
    selecting a second data set that is stored in the main memory and that is associated with a second address on the persistent storage device that is within a selected proximity of the first address on the persistent storage device, the second data set having been written from the persistent storage device to the main memory, and wherein the second data set has not been modified since being written from the persistent storage device to the main memory, the selection of the second data set made based on the proximity of the first and second addresses on the persistent storage device;
    creating a third data set that includes the first data set and the second data set; and
    writing the third data set to the persistent storage device.

2. The machine-readable device of claim 1, wherein the persistent storage device is a hard disk drive, and the first address and the second address are located within a single cylinder on the hard disk drive.

3. The machine-readable device of claim 1, wherein the writing includes,
    determining whether a first sector of the persistent storage device is unreadable, wherein the first sector is associated with the second address; and
    if the first sector is unreadable, writing data associated with the second address to a replacement sector of the persistent storage device.

4. An apparatus comprising:
    a memory manager to select a first data set stored in a main memory of a computer and associated with a first sector on a hard disk drive, the memory manager to select a second data set stored in the main memory and associated with a second sector on the hard disk drive, wherein the second sector is within a predetermined proximity of the first sector on the hard disk drive, and wherein the second data set has not been modified since being written from the hard disk drive to the main memory, and wherein the selection of the second data set is made based on relative locations of the first sector and second sector on the hard disk drive;
    a disk queue to store the first and second data sets as a single disk queue entry; and
    a disk scheduler to transmit the single disk queue entry to the hard disk drive.

5. The apparatus of claim 4 further comprising:
    a disk controller to determine whether the second sector is unreadable, the disk controller to write the second data set to a replacement sector if the second sector is unreadable.

6. The apparatus of claim 4, wherein the first sector and the second sector are within the same track.

7. A computer-implemented method comprising:
    selecting, from a memory of a computer, data that has been modified since being loaded to the memory from a hard disk drive and that is associated with a first address on the hard disk drive;
    identifying a second address on the hard disk drive that is within a selected proximity of the first address on the hard disk drive;
    selecting, from the memory, data that has not been modified since being loaded to the memory from the hard disk drive and that is associated with the second address on the hard disk drive, and wherein the selection of the data that has not been modified is made based on the proximity of the first and second disk addresses on the hard disk drive;
    creating a data set including the modified data and the unmodified data;
    writing the data set to a platter of the hard disk drive, wherein the writing includes,
    determining whether a portion of the platter associated with the second address is unreadable; and
    if the portion is unreadable, writing the unmodified data to a replacement portion of the platter.

8. The method of claim 7, wherein the portion of the platter includes a sector.

9. The method of claim 7, wherein the second address is within a selected proximity of the first address.

10. The method of claim 9, wherein the proximity selection is based on a rotational delay time for the hard disk drive.

11. The method of claim 7, wherein the first address and the second address reside on a common track of the platter.

12. An apparatus comprising:
means for selecting a first data set from a main memory of a computer and that is associated with a first address on a persistent storage device;
means for selecting a second data set from the main memory of the computer and that is associated with a second address on the persistent storage device that is within a predetermined proximity of the first disk address on the persistent storage device, the second data set having been written from the persistent storage device to the main memory, and wherein the second data set has not been modified since being written from the persistent storage device to the main memory, the selection of the second data set made based on the proximity of the first and second addresses on the persistent storage device;
means for creating a third data set that includes the first data set and the second data set; and
means for writing the third data set to the persistent storage device.

13. The apparatus of claim 12, wherein the persistent storage device is a hard disk drive, and the first address and the second address are located within a single cylinder on the hard disk drive.

14. The apparatus of claim 12, wherein the means for writing includes,
means for determining whether a first sector of the persistent storage device is unreadable, wherein the first sector is associated with the second address; and
means for writing data associated with the second address to a replacement sector of the persistent storage device, wherein the data associated with the second address is written if the first sector is unreadable.

15. An apparatus comprising:
a memory manager to select a first data set residing in a main memory of a computer and associated with a first sector on a persistent storage device, the memory manager to select a second data set residing in the main memory and associated with a second sector on the persistent storage device, wherein the second sector is within a predetermined proximity of the first sector on the persistent storage device, and wherein the second data set has not been modified since being written from the persistent storage device to the main memory, and wherein the selection of the second data set is made based on the proximity of the first sector and second sector on the persistent storage device;
a storage queue to store the first and second data sets as a single storage queue entry; and
a storage scheduler to transmit the single storage queue entry to the persistent storage device.

16. A computer-implemented method comprising:
selecting, from a memory of a computer, data that has been modified since being loaded to the memory from a persistent storage device and that is associated with a first address on the persistent storage device;
selecting, from the memory, data that has not been modified since being loaded to the memory from the persistent storage device and that is associated with a second address on the persistent storage device that is within a selected proximity of the first address on the persistent storage device, and wherein the selection of the data that has not been modified is made based on the proximity of the first and second addresses on the persistent storage device;
creating a data set including the data that has been modified since being loaded to the memory from the persistent storage device and the data that has not been modified since being loaded to the memory from the persistent storage device; and
writing the data set to the persistent storage device.

17. The method of claim 16, wherein the writing includes,
determining whether a portion of the persistent storage device associated with the second address is unreadable; and
if the portion is unreadable, writing the data that has not been modified to a replacement portion of the persistent storage device.

* * * * *